June 13, 1944.  M. CHARNYSH  2,351,107

HOLDER FOR THERMOMETERS

Filed Feb. 19, 1941

Inventor

Maurice Charnysh

By Clarence A. O'Brien

Attorney

Patented June 13, 1944

2,351,107

UNITED STATES PATENT OFFICE 2,351,107

HOLDER FOR THERMOMETERS

Maurice Charnysh, Meriden, Conn.

Application February 19, 1941, Serial No. 379,673

1 Claim. (Cl. 206—16.5)

My invention relates to improvements in holders for thermometers, and the like, and the principal object thereof is to provide a simply constructed, inexpensive holder for containing a thermometer and sterilizing fluid and which is adapted to be easily maintained clean and sanitary and is equipped for quick, and easy attachment to, or detachment from, a towel-rack of a bed-side stand, a side or other appropriate part of such a stand, or to the side of the bed or like support.

To the accomplishment of the above, and subordinate objects presently appearing, a preferred embodiment of my invention has been illustrated in the accompanying drawing, set forth in detail in the succeeding description, and defined in the claims appended hereto.

Figures 1, 2:
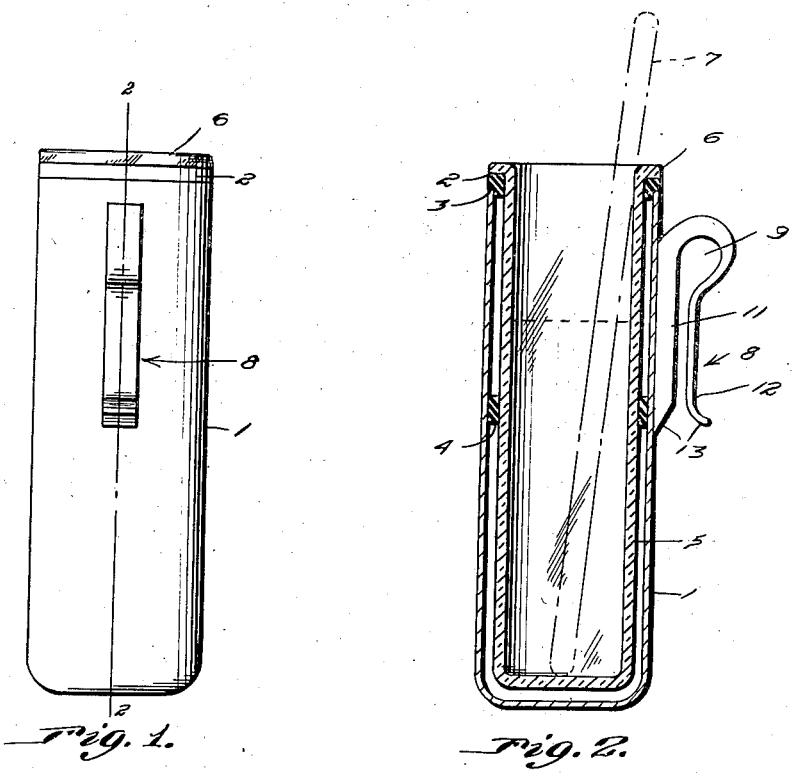
Figure 3:
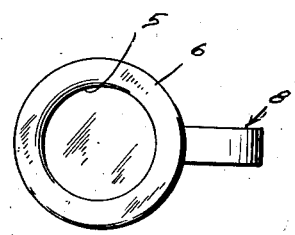

In said drawing:

Figure 1 is a view in side elevation of the preferred embodiment of my invention, Figure 2 is a view in vertical section taken on the line 2—2 of Figure 1, and Figure 3 is a view in top plan.

Referring to the drawing by numerals, my improved holder, as illustrated therein, comprises as its basic element, a cylindrical, open top shell 1, preferably flat-bottomed, and which may be formed of any suitable light strong metal.

Surmounting the rim of the shell 1 is a gasket 2, preferably of rubber, having a rabbeted under edge, as at 3, accommodating said rim and providing for the gasket fitting in the top of the shell 1 for a short distance. A second gasket 4, also preferably of rubber, is fitted in said shell substantially midway of the ends of the latter and suitably secured to the inner wall of the shell. The shell 1 forms a casing for an inner, cylindrical container 5 of glass, open at its top and closed at its bottom. The container 5 is of reduced diameter, as compared with the shell 1, and has a sliding, friction fit in the gaskets 2, and 4, whereby it is spaced by said gaskets from the inner wall of the shell and securely held therein for withdrawal at will for cleaning or replacement when desired. Also the container 5 is provided with a lateral circumferential rim flange 6 designed to seat on the gasket 2 and is of the proper length so that when said flange so seats, the bottom of the container 5 is spaced from the bottom of the shell 1.

The described spacing of the container 5 from the shell 1 provides for eliminating resistance to the insertion of the casing in the shell 1 by air trapped in the shell and reduces frictional resistance to insertion and withdrawal of the container 5. Preferably the container 5 is a standard test tube of the proper length to contain therein the main portion of a thermometer represented by dotted lines, as at 7, and as will be understood, is designed to contain sterilizing fluid such as alcohol or the like.

A downwardly opening, resilient, handle forming clip 8 of elongated form is suitably fixed to the shell 1 for securing the device to a fixed support, said clip embodying an upper loop 9 for fitting with a gripping action around the round part of the usual towel rack of a bed stand, not shown, and a pair of straight, relatively fixed and movable, opposed jaw members 11, 12 for spanning a side of the bed stand or any other similar support, the jaw members having outstanding flaring ends 13 to facilitate attachment of the clip, as will be understood.

As will now be apparent, the described holder of my invention provides a convenient, lightweight, sanitary and easily applied and attached device for holding a thermometer and properly sterilizing the same preparatory to use. The parts are readily and easily disassembled for cleaning, or sterilizing of the same, or replacement when necessary, and the entire device may be manufactured for institutional and private use at a very low cost.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

A holder for thermometers comprising a cylindrical shell having an open top and a closed bottom, a cylindrical container for the thermometer smaller in diameter and shorter than said shell and adapted to be housed in the latter, and means to frictionally lock the container in the shell in spaced relation thereto comprising a resilient annular gasket in the shell substantially midway of the ends thereof and in which the container is frictionally slidable, a rabbeted annular resilient gasket fitting in the open end of the shell and seating on the rim thereof, and an outturned annular rim flange on said container seating against said gasket and holding the same seated against said rim.

MAURICE CHARNYSH.